United States Patent [19]

Savage et al.

[11] 4,106,482
[45] Aug. 15, 1978

[54] AUTONOMIC SOLAR PANEL

[76] Inventors: Fred L. Savage, #47 - 3987 Gordon Head Rd., Victoria, B.C., Canada, V8N 3X5; Alfred D. Long, c/o 1100 Montreal Trust Bldg., 789 W. Pender St., Vancouver, B.C., Canada, V6C 2R8

[21] Appl. No.: 709,386

[22] Filed: Jul. 28, 1976

[30] Foreign Application Priority Data

Apr. 27, 1976 [CA] Canada .................................. 251184

[51] Int. Cl.² .............................................. F24J 3/02
[52] U.S. Cl. ................................................. 126/271
[58] Field of Search ........................................ 126/271

[56] References Cited

U.S. PATENT DOCUMENTS

| | | | |
|---|---|---|---|
| 2,544,474 | 3/1951 | Swanton, Jr. | 126/271 |
| 2,693,939 | 11/1954 | Marchant et al. | 126/271 |
| 3,906,928 | 9/1975 | Wright | 126/271 |
| 3,931,806 | 1/1976 | Hayes | 126/271 |
| 3,996,919 | 12/1976 | Hepp | 126/271 |
| 4,010,734 | 3/1977 | Chayet | 126/271 |
| 4,024,908 | 5/1977 | Meckler | 126/271 |
| 4,052,000 | 10/1977 | Honikman | 126/271 |
| 4,056,092 | 11/1977 | Meier et al. | 126/271 |

*Primary Examiner*—Lloyd L. King
*Attorney, Agent, or Firm*—Birch, Stewart, Kolasch and Birch

[57] ABSTRACT

An autonomic solar heat collecting system is provided. The heart of the system is a solar panel including a flat outer surface adapted to be exposed to the direction of the radiation of the sun. A flat or formed inner sheet is provided which is closely spaced from the outer surface section. Preferably, a flat, transparent plate is provided, which is spaced from, which covers, and is disposed outwardly from, the flat outer section, thereby forming an air-tight compartment between itself and the flat outer surface. Joining the inner and outer surfaces to one another at the top and at the bottom provides a hollow, fluid-tight cavity. Because the inner and outer surfaces are closely spaced from each other, the fluid is in the form of a thin fluid membrane. Means are provided for allowing entrance of a fluid into the cavity and means are provided for removal of the fluid from the other cavity. To provide most efficient control and heat removal, the collector should be made of two copper sheets, the outer of which is flat, separated about 0.016 inches apart with an enclosed volume of fluid not exceeding about 2.3 cu.in./square foot of panel. Due to the small volume of fluid circulating through the solar panel, low power requirements are inherent to the system, and low voltage power is ample to activate the solar energy collecting system independent of any outside power source. Thus, an essential feature of the autonomic system is low wattage, low power pump means activated by a small predetermined temperature differential, and the means for providing power for the operation of the system is solar cells or wet or dry batteries.

29 Claims, 10 Drawing Figures

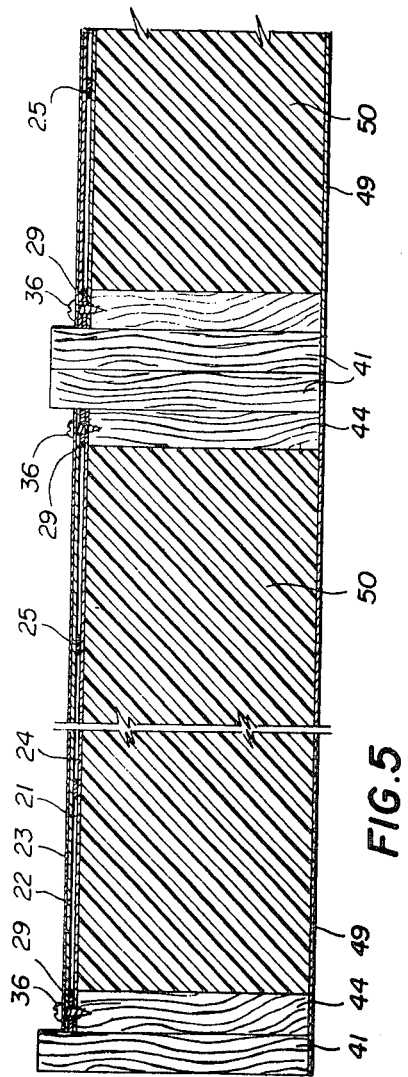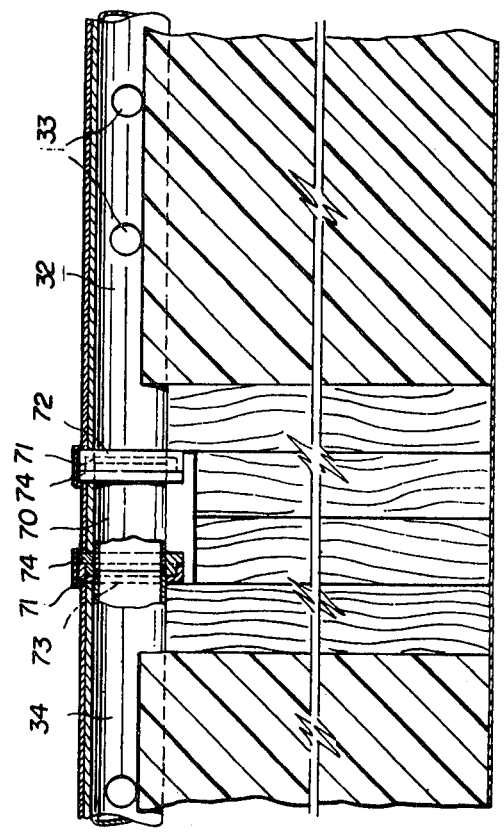

AUTONOMIC SOLAR PANEL

BACKGROUND OF THE INVENTION (i) Field of the Invention

This invention relates to automatic solar heat collecting systems, and in particular, to such system including a solar panel containing a thin fluid membrane as the means for transferring heat.

(ii) Description of the Prior Art

It has become increasingly desirable to find means for exploiting the energy of the sun, in view of the ever-decreasing supply of fossil fuels. The need for a low cost, efficient and easily adaptable solar heat panel is thus evident. Although solar energy has been known to be employed as an energy source in heating buildings, such known means are expensive, complex, and react slowly to solar energy.

Moreover, it is also desirable that a system be provided including a solar heating panel which would require low power for activation. Such system (hereinafter referred to as an autonomic system) could then be substantially independent of external power by providing solar power cells, or electric storage batteries or dry cells to take over automatically in the event of power failure, or which could be controlled manually.

SUMMARY OF THE INVENTION (i) Aims of the Invention

It is an object of the present invention to provide an autonomic solar heat collecting system including means to power, and be integrated with, a solar heat collecting panel having a simple novel construction of low cost, such a system being adapted to provide low voltage power independent of external electric current, but would be of sufficient strength to meet the minimal requirements of the low pressure solar panel apparatus.

It is another object of the present invention to provide such an autonomic solar heat collecting system in which the solar heat collecting panel contains a fluid heat transfer medium flowing between two closely spaced plies of copper sheets, and preferably having a bottom header for admission of the fluid to the panel and a top header for the removal of the fluid from the panel.

It is still another object of the present invention to provide such an autonomic solar heat collecting system in which the solar heat collecting panel has means for rapidly heating the heat transferring fluid, and for continuous and rapid removal of the heated fluid to minimize or even to prevent excessive loss of heat to the surroundings.

It is another object of the present invention to provide such an autonomic solar heat collecting system in which the solar heat collecting panel has temperature sensing means to assist in assuring more efficient heat transfer, and heating and cooling as requisite.

It is still a further object of the present invention to provide such an autonomic solar heat collecting system in which the solar heat collecting panel has the surface exposed to the radiation of the sun made of a matte black finish to maximize absorption of such radiation.

Another object of the present invention is to provide an autonomic solar heat collecting system in which the solar heat collecting panel is provided with insulating means for the fluid-containing compartments in order to minimize loss of heat.

It is still another object of the present invention to provide such an autonomic solar heat collecting system in which the solar panel has a protective transparent covering over the exposed surface in order to minimize wind chill loss of the surface heat.

It is yet another object of this invention to provide such an autonomic solar heat collecting system in which the aforesaid solar panel has a transparent covering which is selected so as to permit entrance of short wave radiation and to minimize the escape of long wave radiation, thereby maximizing the exposure to the sun's energy.

(ii) Statement of the Invention

According to the present invention, an autonomic solar heat collecting system is provided, comprising: a solar heat collecting panel exposed to the sun's radiation, a fluid for absorbing the energy of the sun's radiation within the panel; means for maintaining the fluid under low pressure; means for removing the fluid from the panel; sensing means for monitoring the temperature within the panel; a throughput heat transfer reservoir for accepting the fluid from the solar panel; heat sensing means for monitoring the temperature within the reservoir; low pressure means for regulating the flow of the fluid from the reservoir to the solar panel comprising pump means activated by a small predetermined temperature differential derived from the heat sensing means within the solar panel and the heat sensing means within the reservoir; and means for providing low voltage power for the system, e.g. solar cells or wet or dry batteries to provide low voltage power, or rectified outside power and means for automatically switching from the rectified outside power to an outer source, thus providing the system independent of external power.

By one embodiment of this invention, the solar heat collecting panel comprises a flat outer surface adapted to be exposed to the direction of the sun's radiation; a flat or formed inner sheet closely spaced from the outer surface; a hollow, fluid-tight enclosure provided by joining the inner and outer surfaces to one another and forming a bottom cavity and a top cavity; and gravity return means for the removal of the fluid from the top cavity.

By a second embodiment of this invention, the solar heat collecting panel comprises a flat outer surface adapted to be exposed to the direction of the sun's radiation; a flat or formed inner sheet closely spaced from the outer surface; a hollow, fluid-tight space provided by joining the inner and outer surfaces to one another and forming a bottom cavity and a top cavity; a temperature sensing device; means for allowing entrance of a fluid to the bottom cavity; gravity return means for the removal of the fluid from the top cavity; and a supporting frame at the periphery of the flat sections, the frame extending below that flat or formed inner sheet.

By a third embodiment of this invention, the solar heat collecting panel comprises a flat outer surface adapted to be exposed to the direction of the sun's radiation; a flat transparent plate spaced from, yet covering, and disposed outwardly from the flat outer surface, and forming ideally an air-tight compartment between itself and the flat outer surface; a flat or formed inner sheet closely spaced from the outer surface; a hollow, fluid-tight cavity provided by joining the inner and outer surfaces to one another and forming a bottom cavity and a top cavity; means for allowing entrance of a fluid into the bottom cavity; and gravity return means for the removal of the fluid from the top cavity.

By a fourth embodiment of this invention, the solar heat collecting panel also comprises a flat outer surface adapted to be exposed to the direction of the sun's radiation; a flat transparent plate spaced from, covering, and disposed outwardly from the flat outer surface and forming ideally an air-tight compartment, between the plate and the flat outer surface; a flat or formed inner sheet closely spaced from the outer surface; a larger diameter header tube at the top of the inner and outer surfaces and a smaller diameter header tube at the bottom end forming a fluid-tight space; a temperature sensing device for sensing the temperature of fluid in the fluid-tight space; and a supporting frame at the periphery of the said surfaces, the frame extending below the flat or formed inner sheet.

By a fifth embodiment of this invention, the solar heat collecting panel is in the form of a building panel, comprising, in combination: a generally rectangular peripherally disposed framework; a flat section forming the rear face of the panel; insulating material abutting the flat section and the framework, the insulating material abutting a solar panel forming the front face of the building panel, such panel comprising: a flat outer surface adapted to be exposed to the direction of the sun's radiation; a flat or formed inner sheet closely spaced from the outer surface; a hollow, fluid-tight enlarged space provided by joining the inner and outer surfaces to one another at the top and at the bottom; means for allowing entrance of a fluid into the bottom cavity; and gravity return means for the removal of the fluid from the top cavity.

By a sixth embodiment of this invention, the solar heat collecting panel is in the form of a building panel comprising, in combination: a generally rectangular peripherally disposed framework, a flat backing forming the rear face of the panel, insulating material abutting the flat section and the framework, the insulating material abutting a solar panel forming the front face of the building panel, the solar panel comprising: a flat outer surface adapted to be exposed to the direction of the sun's radiation; a flat transparent plate spaced from, covering, and disposed outwardly from the flat outer surface and forming ideally an air-tight compartment, between the plate and the flat outer surface; a flat or formed inner sheet closely spaced from the outer surface; a hollow, fluid-tight cavity provided by joining the inner and outer surfaces to one another and forming a bottom cavity, and a top cavity; means for allowing entrance of fluid into the bottom cavity; and a gravity return means for the removal of the fluid from the top cavity.

(iii) Other Features of the Invention

By a variant of this invention, the solar heat collecting panel is so constituted that the flat outer surface and the flat inner surface comprise copper sheeting, with the outer surface having, as its exposed face, a matte black finish.

By another variant of this invention, the solar heat collecting panel is so constituted that the surface section is secured to the inner section by means of welded strips of minimum width or formed longitudinal ridges of the inner sheet as required to provide the structural support between the outer surface and the inner surface, the strips or ridges being positioned at the periphery and at intermittent fixed points between the outer and inner surfaces.

By still another variant of this invention, the solar heat collecting panel is so constituted that the cavity sections comprise copper tubing secured to the top and bottom portions respectively of the outer and inner surfaces.

By yet another variant of this invention, the solar heat collecting panel is so constituted that means are provided for introducing a fluid to the copper tubing and means are provided for extracting a fluid from the copper tubing, the means comprising open extensions of the respective copper tubing, particularly where the means are metallic, e.g. copper, tubings.

By a still further aspect of the present invention, the solar heat collecting panel is so constituted that a building panel incorporating the solar heat collecting panel is provided having the framework supportingly extending over the flat backing forming the rear face of the panel.

By still another aspect of the present invention, the solar heat collecting panel is so constituted that a solar heat collecting panel is provided including temperature sensing means located upon the inner or outer surfaces of the panel.

By one variant of this invention, the solar heat collecting panel is so constituted that the flat transparent section is held in its normal position by framing, e.g., extruded aluminum framing sections.

By yet other variants of this invention, the solar heat collecting panel is so constituted that the transparent covering is glass, or a suitable synthetic plastics material, for example, polyvinyl fluoride, cellulose acetate, cellulose propionate, or cellulose polypropionate.

By still another variant of this invention, the solar heat collecting panel is so constituted that flexible hoses are used to introduce fluid into the cavity, and to remove fluid therefrom.

It is preferred that the surface of the panel being exposed to the sun's radiation desirably include a transparent sealed surface to permit entrance of short wave radiation and to prevent escape of long wave radiation. In this way, loss of surface heat through wind conditions as well as loss through reflection is reduced and the heat collecting surface of the solar panel is less affected by atmospheric temperature variations. The transparent surface may be clear glass framed within an extruded aluminum structure forming ideally an air-tight surface, or a clear plastics such as, for example, a flexible polyvinyl fluoride film which has decreased weight and greater durability, or films of other synthetic plastics materials, lensed or otherwise configured to concentrate radiation, e.g. cellulose acetate, cellulose propionate or cellulose polypropionate.

In summary, by the present invention, means are provided for establishing an autonomic system including the solar panel and associated power generating members. Included in this autonomic system is the use of low voltage, low power, aircraft-type 12 volt or other direct current motors, clutches and other electrical components. Power for the entire system can be generated by solar cells so positioned as to be exposed to radiation from the sun. By means of solenoid or manual switches, the system can be incorporated into the solar energy collecting system to provide the source of power.

Due to the very small volume of fluid circulating through the solar panel, low power requirements are inherent to the system, and low voltage power is ample to activate the solar energy collecting system independent of any outside power source. In one variant of this invention, it has been calculated that the fractional horsepower requirements for the system is of the order of 4/100ths H.P. Accordingly, the motivating electrical power requirement is of the order of 12 volts direct current, and can be achieved by transformation of any known alternating or direct power of any amplitude, or alternatively, by wet or dry battery energizing or as stated previously, by solar cells. Alternatively, a secondary switch could tie in the system to standard 12 alternating current to provide power.

BRIEF DESCRIPTION OF THE DRAWINGS

In the accompanying drawings,

FIG. 5 is a section along the line V—V of FIG. 2;

FIG. 6 is a section along the line VI—VI of FIG. 2;

DESCRIPTION OF EMBODIMENTS

Figure 1:
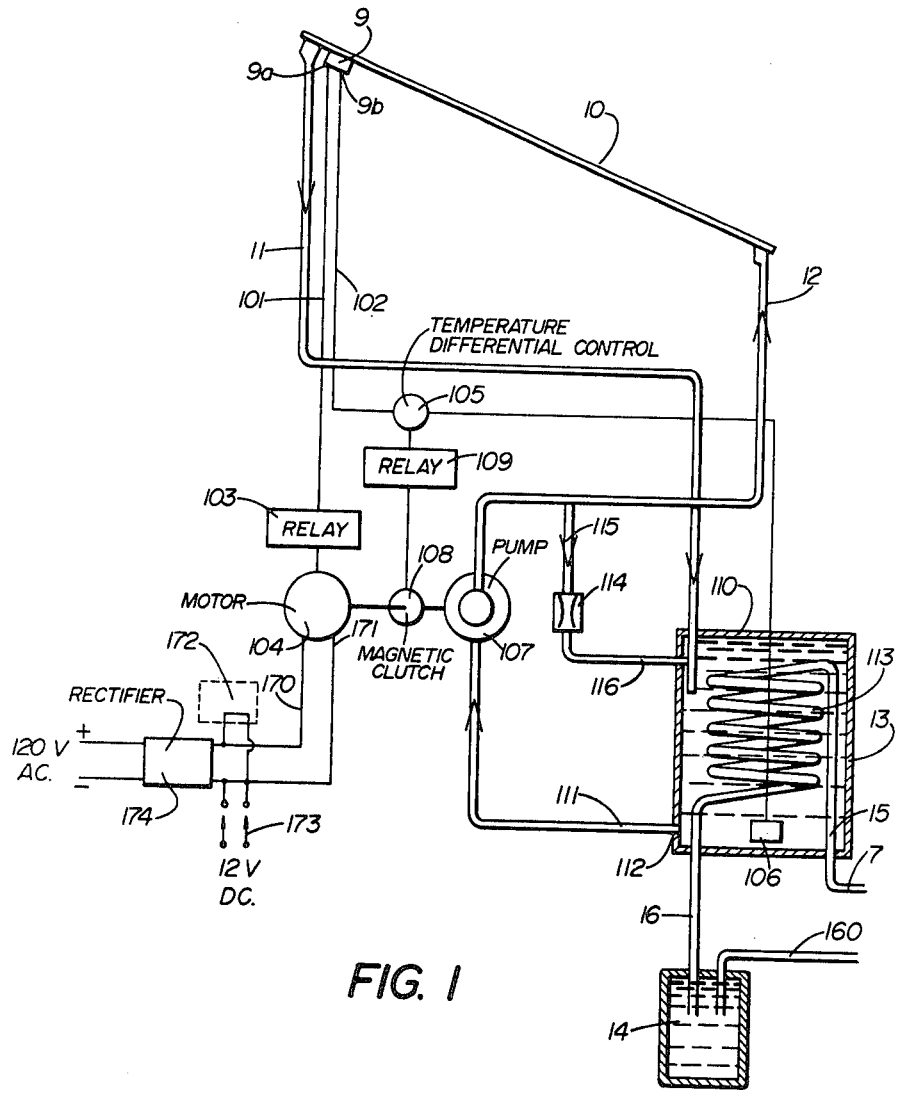
FIG. 1 is a schematic drawing of an autonomic solar heat collecting system of one embodiment of this invention including a solar heat collecting panel, in a heat exchange system.

(i) Description of FIG. 1

Referring to FIG. 1, an autonomic solar heat collecting system is shown including, in schematic form, a solar heating panel. The solar panel 10 is provided with hot fluid outlet and gravity return line 11 and fluid inlet line 12 interconnected to a reservoir and heat exchanger 13. A temperature sensing device 9 is provided within the solar panel 10. Because of its sensitivity to the sun, the temperature sensing device may be located on the underside of the panel 10. The heat sensor 9 is constituted by two sensors 9a and 9b, each provided with its associated control lines 101 and 102. Control line 101 is connected via a relay 103 to a motor 104. The other control line 102 is connected, via a temperature differential control 105, to a temperature sensor 106 within non-pressurized reservoir 13. Motor 104 controls pump 107 by means of a magnetic clutch 108 operated by a relay 109 controlled by temperature differential control 105. Line 11 leads to the inlet 110 of reservoir 13, while line 12 leads via pump 107 from the outlet line 111 at the exit 112 of reservoir 13.

The motor 104 is a direct current motor, which may be a low voltage, low power, aircraft-type motor. The motor is connected by lines 170, 171 to a suitable source of 12 volt D.C. power. Thus, it may be provided by solar cells shown schematically as 172. Alternatively or conjunctively, it may be operated by 12 volt batteries, shown schematically as 173. Furthermore, it could be connected to a rectifier conduit shown schematically as 174, connected to 120 volt A.C. power. Thus, for remote locations solar power or battery power may be used to operate the system. It has been determined that the power requirements for this type of system is of the order of 0.04 horsepower.

Reservoir 13 contains a heat exchanger 113 to heat pressurized water from outside source 7, via circulating inlet lines 15 and outlet line 16 to a typical domestic or commercial hot water heater tank 14, from which it is removed via outlet pipe 160. Thus water is preheated before entering the water heater tank 14. Alternatively, the hot water heater tank 14 may be used to provide supplemental heating in one embodiment of this invention, or (while not shown) to heat circulating water in a low pressure radiator or to boiler feed water, etc.

(ii) Operation of the Invention

In operation, in one embodiment of the invention, when the selected temperature is reached within the panel as sensed by device 9, the motor 104 is started by relay means 103. The motor 104, being connected by a magnetic clutch 108 to a fluid pump 107, positioned on return line 12 is adapted to run continuously above the selected ambient temperature at the panel surface. When the fluid temperature in the reservoir 13 reaches a predetermined level below the panel temperature, the magnetic clutch 108 positively engages the motor 104 to the pump 107 to pump fluid from the reservoir 13 to inlet line 12. If too much fluid is pumped, as sensed by variable flow control 114, fluid flows in by-pass lines 115 back to the reservoir 13. The action of the magnetic clutch provides a secondary control feature.

Since the solar panel has a very small volume of fluid circulating through the system, very little power is required to maintain circulation. Therefore, very low power requirements are needed to provide inputs for the pumping operation, and it has been determined that the power supply for the pump could be generated by low voltage batteries. Such low voltage batteries could be of the known type such as, for example, chemical, or solar cell batteries positioned in close proximity to the solar panel. In conjunction with this system, the motors, clutches and relays would also be converted to operate on low voltage, direct current.

In one preferred embodiment, lines 11, 12 and 111, 115 and 116 are ½ inch copper tubing of this closed loop system.

Thus, the autonomic solar heat collecting system as shown includes a solar panel 10 adapted to absorb the sun's radiation and to transfer the heat so derived to a fluid contained within the solar panel. The fluid flows upwardly through the panel and to and from a reservoir 13 containing heat exchanger 113.

Generally speaking, the solar panel 10 may be positioned fixed or movably fixed utilizing flexible hosing, on or within a roof or wall building panel formed of a wooden peripheral frame with a flat rear section forming the back of the panel and the solar panel forming the front of the panel, insulation being disposed between the back and front sections. In a preferred embodiment for particular use in Canada, the solar panel 10 is angularly slanted at an angle of 60° from the horizontal plane. It is known that, in Canada, this angle would provide the maximum year round exposure to the sun. Other angles of incidence would be provided in other areas of the world, to achieve optimums.

(iii) Description of FIGS. 2 – 6

Figure 7:
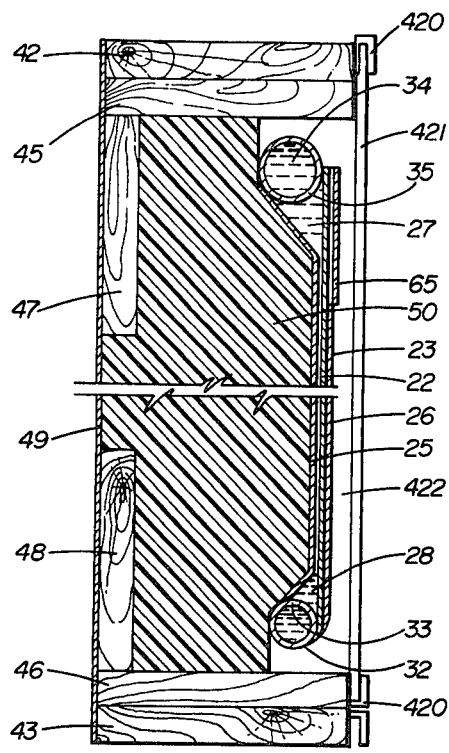
FIG. 7 is a section analogous to a section along line III—III of FIG. 2 but modified by showing a variant of a solar heat collecting system of an aspect of the invention.
Figure 8:
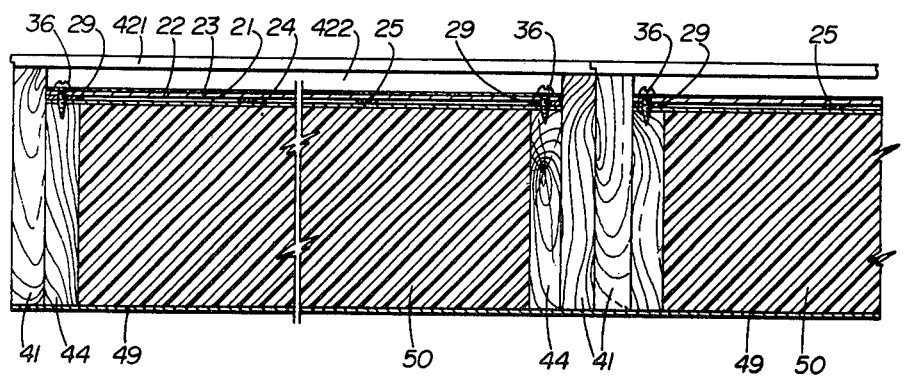
FIG. 8 is a section analogous to a section along line V—V of FIG. 2 but modified by showing a variant of a solar heat collecting system of an aspect of the invention.

The solar heat collecting panel 10 of FIG. 1 must have its inner and outer surfaces very close together, so that there is a thin fluid membrane in the compartment between the sheets. The panels may be in the form 20 as shown in FIGS. 2 – 6 or in the form 720 as shown in FIGS. 7 and 8.

The solar heat collecting panel 20 as shown in FIGS. 2 – 6 comprises a front heat collecting surface 21 made, for example, of copper sheeting 22 and having a matte black finish 23 on the side which is adapted to be exposed to the sun's radiation. The heat collecting surface 21 is attached to a copper backing sheet 24 placed closely adjacent thereto by means of thin vertically disposed parallel strips of metal 25 providing structural support between the front surface copper sheet 21 and the backing copper sheet 24. Thus, a thin fluid membrane in compartment 26 is formed between the two copper sheets 21, 24. The compartment 26 has an upper expansion chamber 27 and a lower chamber 28 at the top and bottom edges, respectively. Lateral strips 29 extend along the vertical sides 30, 31 of sheets 21, 24, and are welded thereto to provide an integral unit. Extending along the lower header chamber 28 is a horizontally disposed 32, preferably formed of copper, having access apertures 33 disposed along its length. Tube 32 is secured by a permanent weld to the bottom edges of the panel sheets 21, 24. An outlet conduit 34 extends horizontally along the upper edges of sheets 21, 24 at the upper expansion chamber 27. Outlet conduit 34 communicates with upper expansion chamber 27 via apertures 35 having means for the removal of a fluid; tube 34 is secured by permanent welding to the top edge of the sheets 21, 24. Fluid is introduced to the lower inlet header 32 and flows into header chamber 28 through inlet ports 33 and continues to the compartment 26. Fluid then flows through the sealed compartment 26 to upper expansion chamber 27 and through ports 35 to outlet conduit 34.

The solar heat collecting panel construction is composed of two types of panels: a master panel 40 and a standard panel 20, each of which is substantially identical and which is formed of framed sections, having peripherally disposed vertical frame members 41, upper horizontal frame members 42 and lower horizontal frame members 43. Internally disposed within vertical frame members 41 are lateral frame members 44, to which solar panel sheets 21, 24 are secured. Also internally disposed within upper and lower frame members 42, 43 are secondary upper and lower frame members 45, 46. Transverse upper and lower reinforcing members 47, 48 are also provided at the rear. A flat rear supporting sheet 49 is secured to the frame members, forming the rear face of the solar panel.

Disposed within the framework, and resting against the inside surface of sheet 49 is a mass of insulation material 50. The solar panel unit heretofore described including outer sheet 21 and inner sheet 24 rests against the insulation material 50, with the outer sheet 21 exposed.

Figure 2:
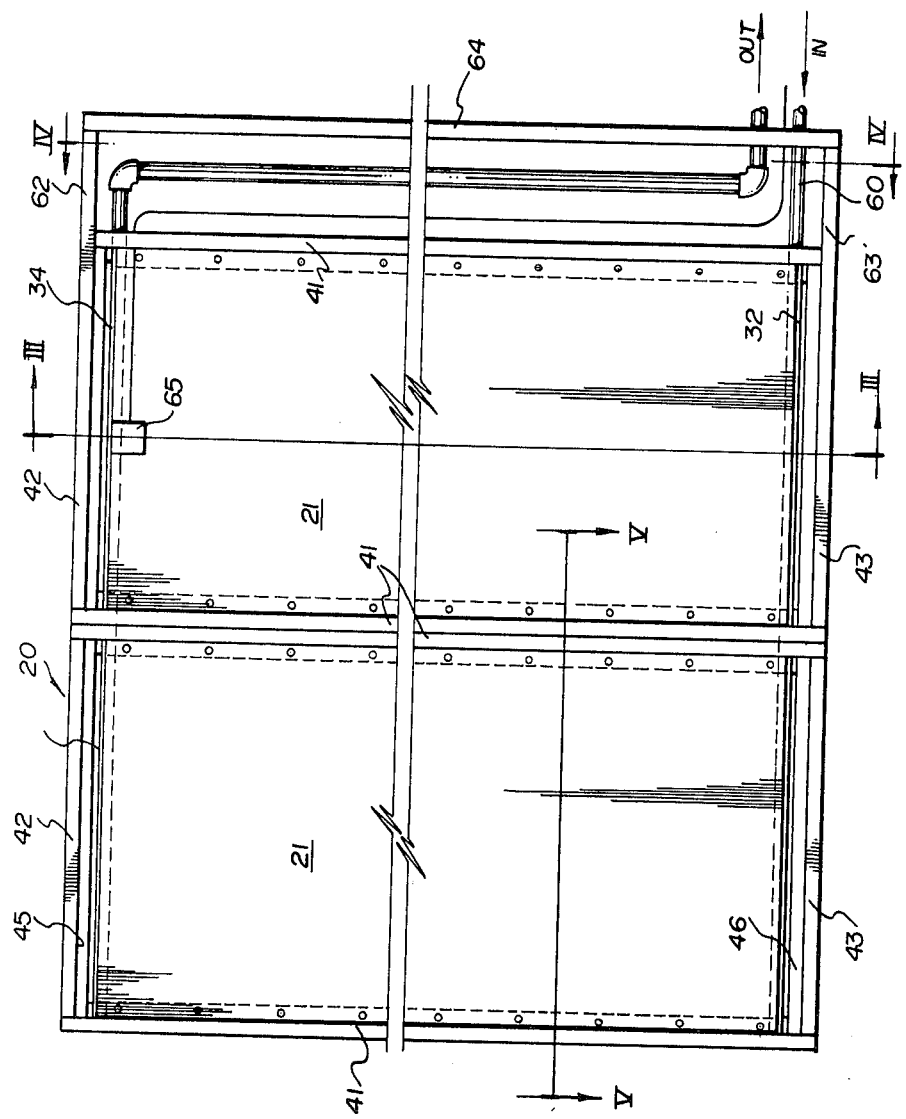
FIG. 2 is a front elevational view of a pair of interconnected solar panels used in the autonomic solar heat collecting system according to aspects of this invention.
Figure 4:
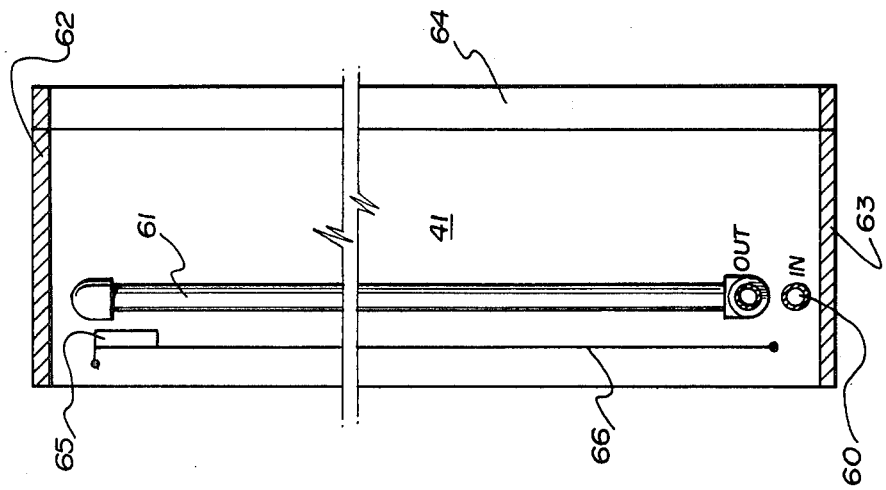
FIG. 4 is a section along the line IV—IV of FIG. 2.
Figure 3:
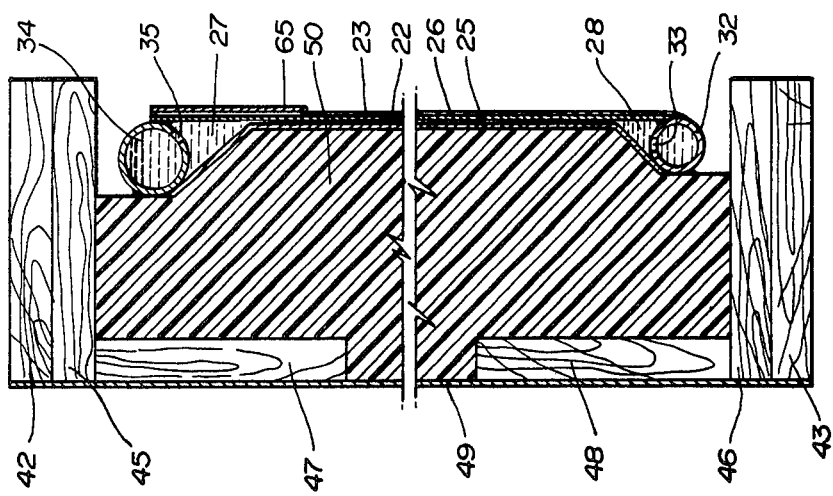
FIG. 3 is a section along the line III—III of FIG. 2.

As seen in FIGS. 2 and 4, an inlet conduit 60 is provided for leading fluid to the lower tube 32. Upper tube 34 leads to an outlet conduit 11. A further framework of upper member 62 (an extension of 42) and lower member 63 (an extension of 43) together with vertical frames 64 are also provided.

Disposed on the copper backing sheet 24 of the master panel 40 are the temperature sensors 9 or 65 leading via line 101 to motor 104, clutch 108, pump 107 combination, associated with the heat exchanger reservoir 13. The amount and rate of flow of fluid within the closed loop system is controlled by temperature differential (as sensed by the temperature sensors 65, 9 and 106 and by temperature differential control 105 as previously described).

FIG. 6 shows a typical manner of connecting the tube 32 or 34 of adjacent panels. A metal coupling 70 including sealing gaskets 74 and including tube fittings 71 at each end is provided, and the ends 72, 73 of the tube 32 of adjacent panels are inserted in the coupling and secured therein by said tube fittings 71.

The solar collector panel 10 would be incorporated into a system of roof panels, (as shown in FIG. 1) or wall panels exposed to the sun in an autonomic solar system according to an aspect of this invention. The panels may be supplied with, for example, a water/glycol mixture pumped from a storage reservoir, or with Glauber's salt to remove heat from the panels. Heat exchanger coils within the reservoir would be used to transmit the stored heat to use areas.

(iv) Description of FIGS. 7 and 8

FIG. 7 shows the section analogous to a section along line III—III of a modification of the solar heat collecting panel of FIG. 2 showing a modification 720 thereof. However, in this embodiment, the heat collecting surface 21 is covered by a transparent member 421 supported over the exposed surface of the panel 10 by a suitable frame 420, e.g. an extruded aluminum frame 420. The frame 420 is placed about the perimeter of the panel 720, as seen in FIG. 8, to form ideally an airtight seal and to minimize wind chill loss of heat. The transparent member is selected to ensure the long wave radiation which reflects off the matte black finish 23 of the heat collecting surface 21 does not pass through the selected transparent member, but instead re-reflects off the inside of the member to concentrate the heating effect. The compartment 422 permits short wave radiation to heat the entire black finish 23 while trapping long wave radiation between the member 421 and the surface 23 of the panel 21.

Suitable transparent members which may be used include glass, and synthetic plastics materials, lensed or otherwise, such as, for example, polyvinyl fluoride, cellulose acetate, cellulose propionate and cellulose polypropionate.

(v) Description of One Preferred Embodiment

In one embodiment of this invention, the solar heat collector 10 is made up of two copper sheets separated 0.106 inch apart, by ridges or strips welded to both top and bottom sheets. The quantity of fluid held between the sheets of each panel is preferably 2.3 cubic inches per square foot and preferably does not exceed 20 cubic inches in total volume. Each panel, whether it be standard or master, exposes a black, flat collector surface preferably of 1017 square inches to the sun. The black surface may be provided with a film transparent to ultra violet rays but opaque to infra red to minimize dissipation of heat. In one embodiment, the bottom inlet header has a diameter of ½ inch and the top header outlet has a diameter of ¾ inch. This fluid enters the inlet header under pressure and has substantially no pressure at the top outlet header.

In one embodiment, the total surface of the collector is exposed both to the sun and fluid, except for the separating strips of minimum width. Fluid flow through the panel is adjusted to obtain the fastest heating cycle and continuous, steady removal of heat at an efficient rate through the collector surface, by correlation of the flow volume and flow rate dependent on the temperature differential of the fluid sensed by the temperature sensor in the solar panel and the temperature sensor in the reservoir, as previously described. Provision is made through the electrical/electronic controls previously described to monitor the flow action. There is thus provided a fully automatic temperature controlled motor, magnetic clutch and pump operation within set temperature differentials between the collector and the reservoir. Moreover, since the system is designed to operate under low power, an autonomic system has been provided. The top and bottom headers preferably of ¾ inch and ½ inch copper tubing, respectively, are simply attached, preferably through soldering and metal joining or other welding means.

Figure 10:
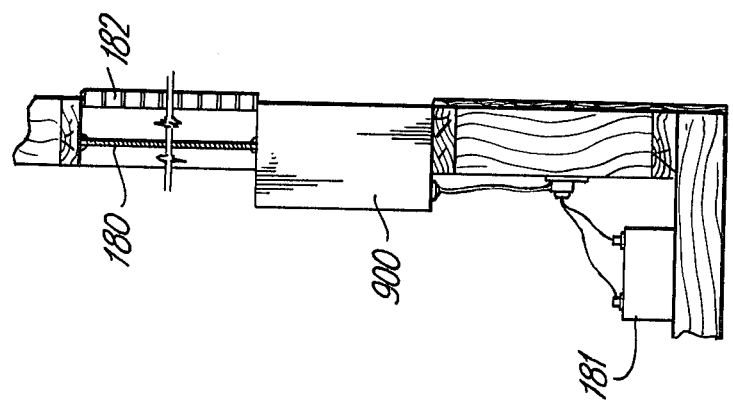
FIG. 10 is a schematic side elevational view of the aspect of FIG. 9 mounted on a wall or window of a structure.
Figure 9:
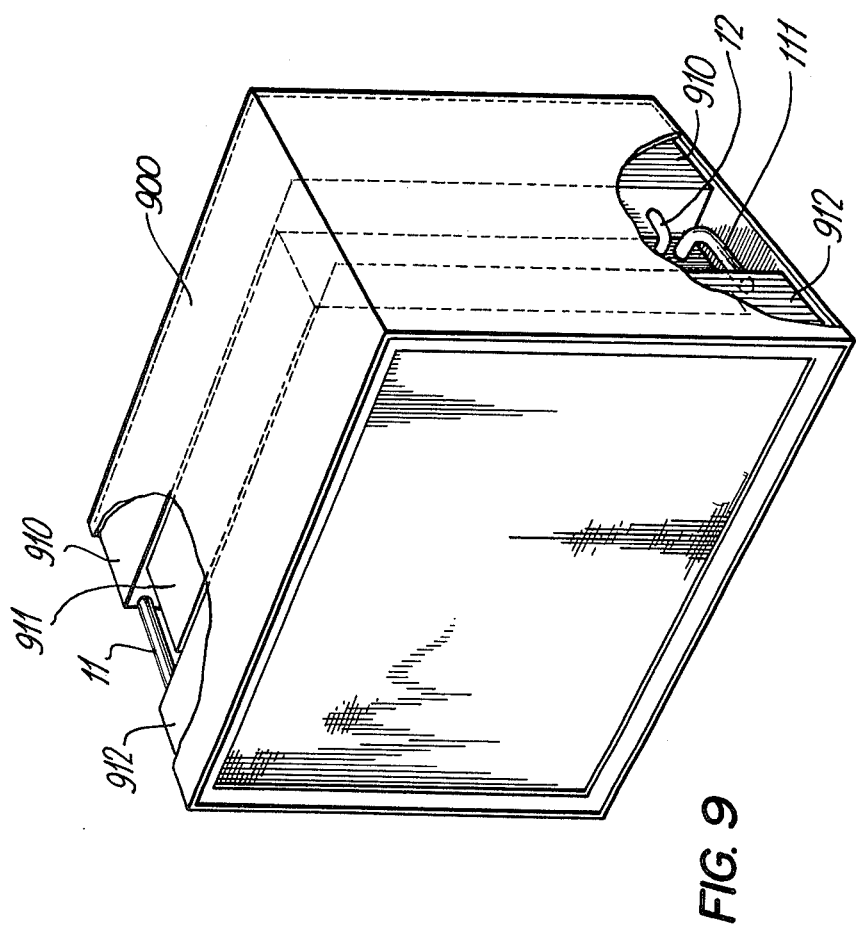
FIG. 9 is a perspective, partially broken away view of a portable combined solar cell/pump/heat exchanger unit as shown in FIG. 1 in a self contained enclosure according to another aspect of this invention.

(vi) Description of FIGS. 9 and 10

As seen in FIG. 9 the portable autonomic unit 900 includes the solar panel 10 in an enclosure 910, the motor 104, clutch 108 and pump 107 combination in an enclosure 911, and the heat exchanger reservoir 13 in an enclosure 912. The units 910, 911 and 912 are interconnected by suitable pipes, i.e. line 11 from solar panel 10 to the heat exchanger 13, line 111 from the heat exchanger to the pump 107 and line 12 from the pump 107 to the solar panel.

As seen in FIG. 10, the unit 900 is mounted on a wall or window 180. The system is autonomic, i.e. it is provided with a 12 volt D.C. battery 181 to provide low wattage power, or with alternative or auxiliary low wattage power generating solar cells 182.

The portable autonomic unit 900 may conveniently be of the same dimensions as a conventional window air conditioner or a suitcase. As noted above, the solar cell, the pump and controls, and the heat exchanger are mounted within the enclosure. The unit 900 may be mounted in the window or wall of a room of a building or may be mounted on a table facing a window. The unit 900 could then be operated autonomically to keep the room moderately warm and thus substantially free of mildew, etc.

Summary

Thus, by this invention, an autonomic solar heating system including a solar panel is provided which includes simple construction particularly at the inlet (bottom) and outlet (top) headers which has been a problem in other designs. Large flat areas are exposed directly to the sun and almost equally to a fluid which preferably is a water/glycol solution for maximum conductivity of heat. An extremely small quantity of such solution, in effect a thin fluid membrane, is held within the panels for fast heating, temperature control and low re-emission with rapid reaction to sun phases.

Accordingly, by this invention, there is provided not only a low cost heating system adaptable to old and new homes, buildings, etc., but also a supplemental heating or cooling system for electrical and fossil fuel heating systems.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. An autonomic solar heat collecting system comprising: a solar collecting panel exposed to the sun's radiation, said solar collecting panel comprising a flat outer surface adapted to the direction of the sun's radiation, a flat or formed inner sheet closely spaced from the flat outer surface to provide a thin plate-like passageway between the inner sheet and the outer sheet, whereby heat transfer medium flowing therebetween is in the form of a thin fluid membrane, a hollow fluid-tight cavity provided by joining the inner and outer surfaces to one another and forming a bottom cavity and a top cavity, means for allowing entrance of a fluid into said bottom cavity, and gravity return means for the removal of said fluid from the said top cavity; heat transfer medium means for adsorbing the energy of the sun's radiation within said plate-like passageway of said panel; means for removing said medium from the panel, sensing means for monitoring the temperature within the panel; a through-put heat transfer reservoir for accepting said medium for said solar panel; heat sensing means for monitoring the temperature within said reservoir; low pressure means for returning said medium to said solid panel from said reservoir, low pressure means for regulating the flow of said medium from said reservoir to said solar panel comprising pump means operable under low wattage and low power and activated by a small predetermined temperature differential derived from said heat sensing means within said solar panel and said heat sensing means within said reservoir; and means for providing such low wattage, low power for the operation of said system.

2. The system of claim 1, wherein the two surfaces of the solar collecting panel are spaced about 0.016 inch apart.

3. The system of claim 2, wherein said solar collecting panel includes a flat transparent plate spaced from, covering, and disposed outwardly from said flat outer surface, and forming an air-tight compartment, between itself and said flat outer surface.

4. The system as set forth in claim 2, wherein in said solar collecting panel said flat outer surface each and said flat inner surface comprise copper sheeting, with said outer surface having, as its exposed face, a matte black finish.

5. The system as set forth in claim 2, wherein in said solar collecting panel said outer surface is secured to said inner surface by means of welded strips of minimum width or formed longitudinal ridges of the inner sheet as required to provide the structural support between said outer surface and said inner sheet, said strips or ridges being positioned at the periphery and at intermittent fixed points between said outer and inner surfaces.

6. The system as set forth in claim 2, wherein in said solar collecting panel said top and bottom cavities comprise copper tubing secured to the top and bottom portions respectively of said outer and said inner surfaces.

7. The system as set forth in claim 6 including means for introducing fluid to said copper tubing and means for extracting same from said copper tubing, said means comprising open extensions of said respective copper tubing.

8. The system as set forth in claim 7 including means for securely attaching one open extension of said copper tubing to another open extension on another said copper tubing.

9. The system as set forth in claim 6 including means for introducing fluid to said copper tubing and means for extracting same from said copper tubing, said means comprising additional metallic tubing.

10. The system as set forth in claim 6 including means for allowing passage of a fluid between said cavities consisting of small ports positioned on the inside exposed edge of said copper tubing.

11. The system as set forth in claim 3 wherein in said solar collecting panel said flat transparent plate is held in its normal position by framing.

12. The system of claim 11 wherein said framing is extruded aluminum sections.

13. The system of claim 3 wherein in said solar collecting panel the flat transparent plate is formed of glass.

14. The system of claim 3 wherein, in said solar collecting panel, the flat transparent plate is formed of synthetic plastics marerial.

15. The system of claim 3 wherein, in said solar collector panel, the flat transparent plate is formed of synthetic plastics material selected from the group consisting of polyvinyl fluoride, cellulose acetate, cellulose pripionate or cellulose polypripionate.

16. The system as set forth in claim 3 wherein in said solar collecting panel the means for introducing a fluid into said cavity and for extracting said fluid from said cavity comprises flexible hose attachments.

17. The system of claim 3 wherein said solar heat collecting panel includes a larger diameter header tube at the top of said flat sections and a smaller diameter header tube at the bottom end of said sections forming a fluid-tight space; a temperature sensing device for sensing the temperature of fluid in said fluid-tight space, and a supporting frame at the periphery of said flat sections, said frame extending below said flat inner section.

18. The system of claim 1 wherein said solar heat collecting panel includes a larger diameter header tube at the top of said flat sections and a smaller diameter header tube at the bottom end of said sections forming a fluid-tight space; a temperature sensing device; and a supporting frame at the periphery of said flat sections, said frame extending below said flat inner section.

19. The system as set forth in claim 18, and including a temperature sensing device disposed either above or below said panel.

20. The system as set forth in claim 18, with said smaller diameter header tube having means for allowing the entrance of a fluid and said larger diameter header tube having means for the removal of said fluid, said means comprising an open valve connected to a continuous source of said fluid.

21. The system as set forth in claim 18, and including insulating material within said frame extension below said flat inner section.

22. The system of claim 1 wherein said solar collector panel is in the form of a building panel comprising in combination: a generally rectangular peripherally disposed framework; a flat section forming the rear face of the panel; insulating material abutting said flat section and said framework, said insulating material abutting a solar panel forming the front face of said building panel.

23. The system of claim 22 wherein, in said building panel, said framework supportingly extends over said flat section, thereby forming the rear face of the panel.

24. The system of claim 22 wherein, in said building panel, there is internally disposed within said framework, additional frame members, to which said polar panel is secured.

25. The system of claim 1 wherein said solar panel is in the form of a building panel comprising in combination: a generally rectangular peripherally disposed framework; a flat section forming the rear surface of the panel, insulating material abutting said flat section and said framework, said insulating material abutting a solar panel forming the front face of said building panel.

26. The autonomic system as claimed in claim 1 wherein said power source comprises solar cells.

27. The autonomic system as claimed in claim 1 wherein said power source comprises wet or dry batteries.

28. The autonomic system as claimed in claim 1 wherein said power source includes, in addition, rectified A.C. external power.

29. The autonomic system as claimed in claim 28 and including auxiliary power comprising one or both of solar cells and wet or dry batteries and switching means which upon power failure, will operate to connect the auxiliary power source, thereby switching the system to be independent of external power.

* * * * *